April 21, 1925.                                                         1,535,013
L. A. ZILLMANN
AUTOMOBILE SIGNAL
Filed March 27, 1922
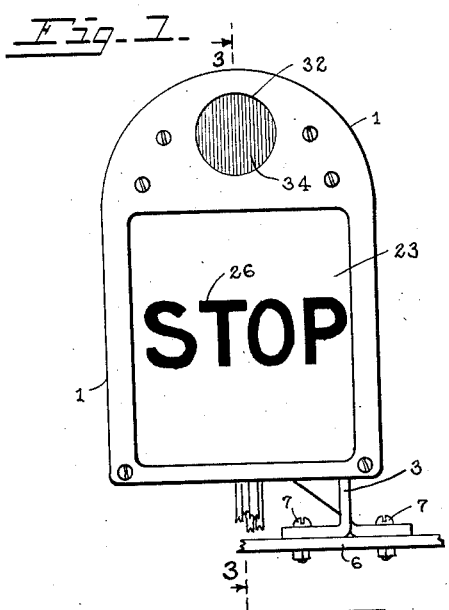
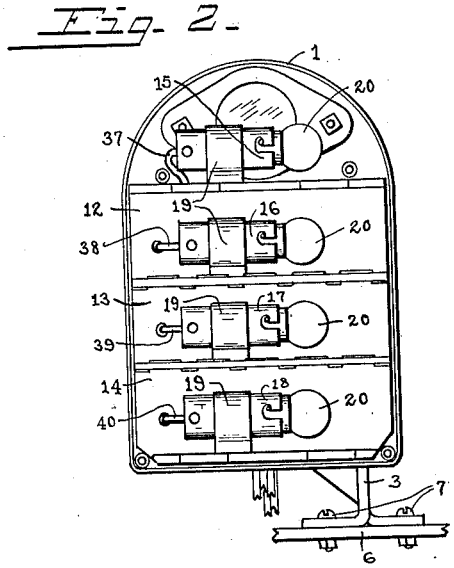
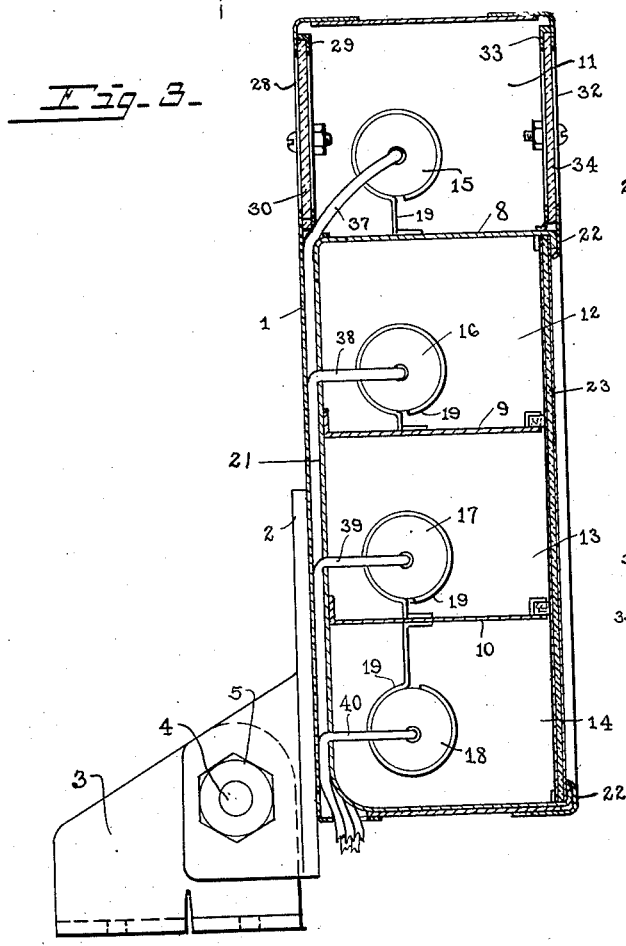
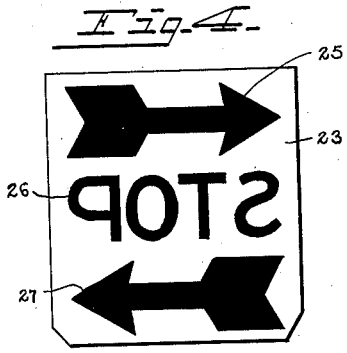
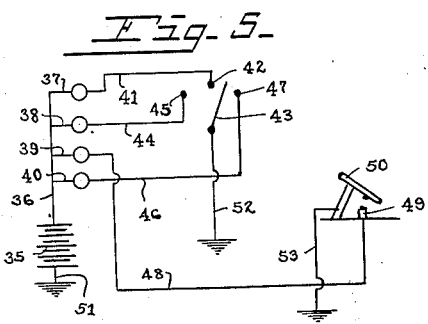
INVENTOR.
Ludwig A. Zillmann
BY Morrill & Keeney
ATTORNEYS.

Patented Apr. 21, 1925.

1,535,013

UNITED STATES PATENT OFFICE.

LUDWIG A. ZILLMANN, OF MILWAUKEE, WISCONSIN.

AUTOMOBILE SIGNAL.

Application filed March 27, 1922. Serial No. 547,101.

*To all whom it may concern:*

Be it known that I, LUDWIG A. ZILLMANN, a citizen of the United States, and resident of Milwaukee, in the county of Milwaukee and State of Wisconsin, have invented new and useful Improvements in Automobile Signals, of which the following is a description, reference being had to the accompanying drawings which are a part of this specification.

This invention relates to automobile signals and has for its object to provide a signal which will combine an automobile parking lamp with a motion and direction indicating means.

A further object of the invention is to provide a signal of the character described in which the various movements of a motor vehicle may be indicated to others, either by day or by night.

A still further object of the invention is to provide an electrically illuminated signal in which the control of the means indicating the various movements of the vehicle will be partly mechanical, and partly automatic.

A still further object of the invention is to provide a signal of the class described which will be simple in construction, comparatively inexpensive to manufacture, and more efficient in action than those which have been heretofore proposed.

In the accompanying drawings, in which like numerals designate like parts in all the views;

Figure 1 is an elevational view of a signal made in accordance with the present invention.

Fig. 2 is a view similar to Fig. 1 with the rear cover or wall thereof removed to show the interior arrangement.

Fig. 3 is a central vertical sectional view, on an enlarged scale of the parts shown in Figs. 1 and 2, taken approximately on the line 3—3 of Fig. 1.

Fig. 4 is a diagrammatic elevational view of the transparent or translucent plate member bearing the signal characters, as seen from a direction opposite to that in Fig. 1; and Fig. 5 is a diagrammatic view illustrating the electrical circuits employed to control the present signal.

Referring more especially to Figs. 1, 2 and 3, 1 indicates a casing which may be constructed of any suitable material, such as sheet metal and which preferably is substantially of the form shown. The said casing has rigidly secured to it, a bracket member 2, which is adapted to be pivotally secured to a supporting member 3 by the bolt 4, which may be provided with a locking nut 5, and if desired, with spring washers, not shown. The said supporting member 3, may be secured to any suitable portion 6, of the frame or body of a motor vehicle, as by means of suitable screws or bolts, 7, as will be clear from the drawings.

Mounted within the casing 1 is a somewhat smaller casing 21 provided with a top wall 8 and with a pair of horizontal transversely extending shelves or partitions 9, and 10, forming a plurality of chambers 11, 12, 13, and 14, in which are mounted the lamp receptacles 15, 16, 17, and 18, respectively, by means of suitable clamping members 19, secured to the said partitions 8, 9, and 10, or supported in any other suitable manner. Each of the said receptacles 15, 16, 17, and 18 is provided with an incandescent lamp 20 adapted to illuminate the interior of the respective chambers 11, 12, 13, and 14, upon the closing of the particular circuit in which the said lamp may be included.

The rear wall of the casing 1, is preferably flanged as at 22, to receive and retain a glass, celluloid or other transparent or translucent plate 23, which closes the rear of the chambers 12, 13 and 14, as will be readily apparent. The said plate 23 is provided with suitable symbols such as words, signs, or the like, so arranged as to register with the said chambers 12, 13 and 14; that is to say, the upper portion, constituting approximately one-third of the vertical distance of the plate 23 may bear an arrow or other symbol 25, pointed in one direction, say toward the left, as seen in Fig. 1, or toward the right, as seen in Fig. 4. Immediately below this symbol and occupying substantially the middle one-third of the plate 23, a second symbol 26, such for example as the word "Stop," may be placed, adapted to register with the chamber 13, while the lowermost third of the plate 23 may bear a third symbol 27, such for example as an arrow, pointing in the opposite direction to arrow 25, which last mentioned symbol 27, is adapted to register with the chamber 14.

The front wall of the casing 1 is preferably spaced somewhat from the corresponding wall of the casing 21, see Fig. 3, and is provided with an opening registering with the chamber 11, which opening may be surrounded by a suitable retaining means 29, adapted to receive and retain the clear glass member 30, while the rear wall of the said casing 1 is provided with an opening 32, surrounded by a retaining member 33, adapted to receive and retain the ruby or other colored glass 34.

The electrical connections for illuminating the lamps 20, will be understood from the wiring diagram illustrated in Fig. 5, wherein current from the battery 35 passes along a wire 36, to which is connected the wires 37, 38, 39, and 40, which may lead respectively, to the sockets 15, 16, 17, and 18, containing the lamps 20. From the socket 37, a wire 41, leads to a contact point 42 of a manually controlled switch 43, while from the socket 38, a wire 44, leads to a similar contact point 45, of the said switch, and from the socket 40, a wire 46, leads to a contact point 47. From the socket 39, a wire 48, leads to a contact point 49, of a switch, controlled by the brake pedal 50, while the wires 51, 52, and 53 provide ground connections, respectively, for the battery 35, the switch 43, and the brake pedal switch 49, as will be readily apparent. As will be clear from Fig. 3, the space between the front walls of the casings 1 and 21 serves as a conduit through which the wires or cables 37, 38, 39 and 40 may be led to their respective compartments and receptacles.

The operation of the device will be clear from the foregoing, but may be briefly summarized as follows:

If the vehicle is proceeding along the roadway, and it is the intention of the operator to turn to the left, he manually moves the switch lever 43 into contact with the member 45, whereupon current will flow from the battery 35, along the wires 36, and 38 to the receptacle 16 and lamp 20 contained therein, and from the said receptacle along the wire 44 to contact point 45, along the switch lever 43 and wire 52 to the ground, from whence it returns to the battery 35 by means of the wire 51. This of course will cause the lamp 20, within the compartment 12 to illuminate the said compartment and the symbol carried by the plate 23, opposite the said compartment, thus indicating to others the intention of the operator to make a left hand turn.

In like manner, if the operator desires to make a right hand turn, he moves the switch lever 43 into engagement with the contact point 47, whereupon the lamp within the compartment 14 will be lighted, thus illuminating the symbol, indicating a right hand turn.

When the vehicle is being brought to a standstill, upon the disengagement of the clutch and depression of the brake pedal 50 to apply the brakes, such depression will cause contact to be made with the switch 49, thereby lighting the lamp within the compartment 13 and illuminating the symbol indicating a stop.

When the vehicle is being parked or left standing for any length of time at night, and it is desired to employ a parking lamp, the switch lever 43 is moved into engagement with the contact member 42, whereby the lamp 20, within the compartment 11, will be lighted, thus illuminating the said compartment and showing a white light to the front, through the clear glass plate 30, and a red light to the rear through the ruby glass 34, as is required by the usual traffic requirements.

It is obvious that those skilled in the art may vary the details of construction as well as the arrangement of parts, without departing from the spirit of the invention and therefore it is not wished to be limited to the above disclosure, except as may be required by the claim.

What is claimed is:

A motor vehicle signal comprising an outer casing; an inner casing mounted within said outer casing with its front and top walls in spaced relation to the corresponding walls of said outer casing, said top wall of said inner casing forming with adjacent portions of said outer casing, a parking lamp compartment the front and back walls of which are provided with oppositely disposed openings; a plurality of horizontal transverse portions within said inner casing forming other compartments below said parking lamp compartment; clear and colored glasses mounted in the respective parking lamp openings; a light transmitting plate provided with motion and direction indicating symbols carried by said inner casing in co-operative relation to said lower compartments; an electric lamp in each of said compartments; and electrical conductors leading to said lamps arranged in the space between the front walls of said casings.

In testimony whereof, I affix my signature.

LUDWIG A. ZILLMANN.